(12) United States Patent  (10) Patent No.: US 8,350,675 B2
Riechel  (45) Date of Patent: Jan. 8, 2013

(54) TRIGGERING A RADIO FREQUENCY IDENTIFICATION SCAN USING IMAGE RECOGNITION

(75) Inventor: Patrick S. Riechel, Briarwood, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 66 days.

(21) Appl. No.: 12/771,406

(22) Filed: Apr. 30, 2010

(65) Prior Publication Data

US 2011/0267172 A1   Nov. 3, 2011

(51) Int. Cl.
*G06K 7/01* (2006.01)
*G06K 9/68* (2006.01)
*H04N 5/225* (2006.01)

(52) U.S. Cl. ............... 340/10.1; 348/222.1; 382/312; 382/103; 382/115; 382/325

(58) Field of Classification Search ................ None
See application file for complete search history.

(56) References Cited

U.S. PATENT DOCUMENTS

| 4,920,488 | A * | 4/1990 | Filley ............................... 705/28 |
| 5,383,111 | A * | 1/1995 | Homma et al. .............. 705/26.7 |
| 7,151,454 | B2 | 12/2006 | Washington |
| 7,944,393 | B2 * | 5/2011 | Bratthall et al. ......... 342/357.25 |
| 8,009,864 | B2 * | 8/2011 | Linaker et al. ................ 382/103 |
| 2005/0201826 | A1 * | 9/2005 | Zhang et al. ..................... 404/2 |
| 2006/0197838 | A1 * | 9/2006 | Yamakita ....................... 348/169 |
| 2006/0267730 | A1 * | 11/2006 | Steinke et al. ................ 340/10.1 |
| 2007/0252702 | A1 | 11/2007 | Wulff et al. |
| 2008/0001714 | A1 * | 1/2008 | Ono et al. ...................... 340/10.1 |
| 2008/0136623 | A1 | 6/2008 | Calvarese |
| 2008/0211631 | A1 * | 9/2008 | Sakamoto ..................... 340/10.1 |
| 2008/0285091 | A1 * | 11/2008 | Skaaksrud et al. ............ 358/473 |
| 2009/0146782 | A1 * | 6/2009 | Cordes ......................... 340/10.1 |
| 2009/0147025 | A1 * | 6/2009 | Grigsby et al. ............... 345/633 |
| 2009/0295545 | A1 | 12/2009 | O'Haire et al. |
| 2009/0313142 | A1 * | 12/2009 | Hiruma et al. .................. 705/28 |
| 2009/0315678 | A1 * | 12/2009 | Padmanabhan et al. ..... 340/10.1 |

(Continued)

FOREIGN PATENT DOCUMENTS

WO   2004059563   7/2004

OTHER PUBLICATIONS

International Search Report and Written Opinion dated Nov. 30, 2011 in related case PCT/US2011/030630.

*Primary Examiner* — Benjamin C Lee
*Assistant Examiner* — Rajsheed Black-Childress
(74) *Attorney, Agent, or Firm* — Brian M. Mancini

(57) ABSTRACT

A system and method for triggering a radio frequency identification, RFID, scan using image recognition includes; storing (300) image attributes of inventoried RFID-tagged items in a database along with information associated with the RFID-tagged items, capturing (302) an image of an item from an imaging device, determining (304) if there is a match between attributes of the captured image compared with the stored image attributes in the database indicating that the item is RFID-tagged, and upon a match determination (304) attempting to read (306) an RFID tag of the item.

10 Claims, 3 Drawing Sheets

U.S. PATENT DOCUMENTS

| | | | |
|---|---|---|---|
| 2010/0026470 A1* | 2/2010 | Wilson et al. | 340/10.52 |
| 2010/0060931 A1* | 3/2010 | Ichikawa et al. | 358/1.15 |
| 2010/0245035 A1* | 9/2010 | Jeon et al. | 340/5.8 |
| 2011/0080264 A1* | 4/2011 | Clare et al. | 340/10.1 |
| 2011/0093279 A1* | 4/2011 | Levine et al. | 705/2 |
| 2011/0156869 A1* | 6/2011 | Watt | 340/10.1 |
| 2011/0156879 A1* | 6/2011 | Matsushita et al. | 340/10.1 |
| 2011/0241823 A1* | 10/2011 | Anders | 340/5.8 |
| 2011/0241833 A1* | 10/2011 | Martin et al. | 340/10.1 |
| 2011/0248848 A1* | 10/2011 | Reeves et al. | 340/540 |

* cited by examiner

TRIGGERING A RADIO FREQUENCY IDENTIFICATION SCAN USING IMAGE RECOGNITION

FIELD OF THE DISCLOSURE

The present invention relates generally to radio frequency identification (RFID) devices and more particularly to triggering a radio frequency identification scan using image recognition.

BACKGROUND

At present, stores and warehouses can stock items that include small, electronic identification tags. Such radio frequency identification (RFID) tags are not self-powered, but are powered and triggered to respond with their stored identification information upon being scanned by a local RFID scanner. Usually, stores and warehouses have inventories of items that include some items that are tagged with RFID tags and other items that are not tagged with RFID tags. In practice, RFID scanners can read the tags on tagged items using a hand-held, battery-powered RFID reader or through the use of an automated RFID scanning device. These scanners can be triggered manually, by a user, or can be triggered automatically using sensors that detect the presence of an item in proximity to the RFID scanner.

Unfortunately, existing scanners or sensors do not know whether a particular item has an RFID tag or not. Therefore, the typical procedure has been to assume that an RFID tag is always present on an item, and to generate an RFID scan for every item, even if the scan is unnecessary. However, triggering a scan of an untagged item will just drain power in the scanner, which can be an issue for battery-powered scanners. In addition, generating an RFID scan for every item, even when unnecessary due to lacking an RFID tag, can possibly generate local RF spectrum interference for nearby RFID scanners or other devices.

Accordingly, there is a need to reduce battery drain in, and possible RF interference from, an RFID scanner.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
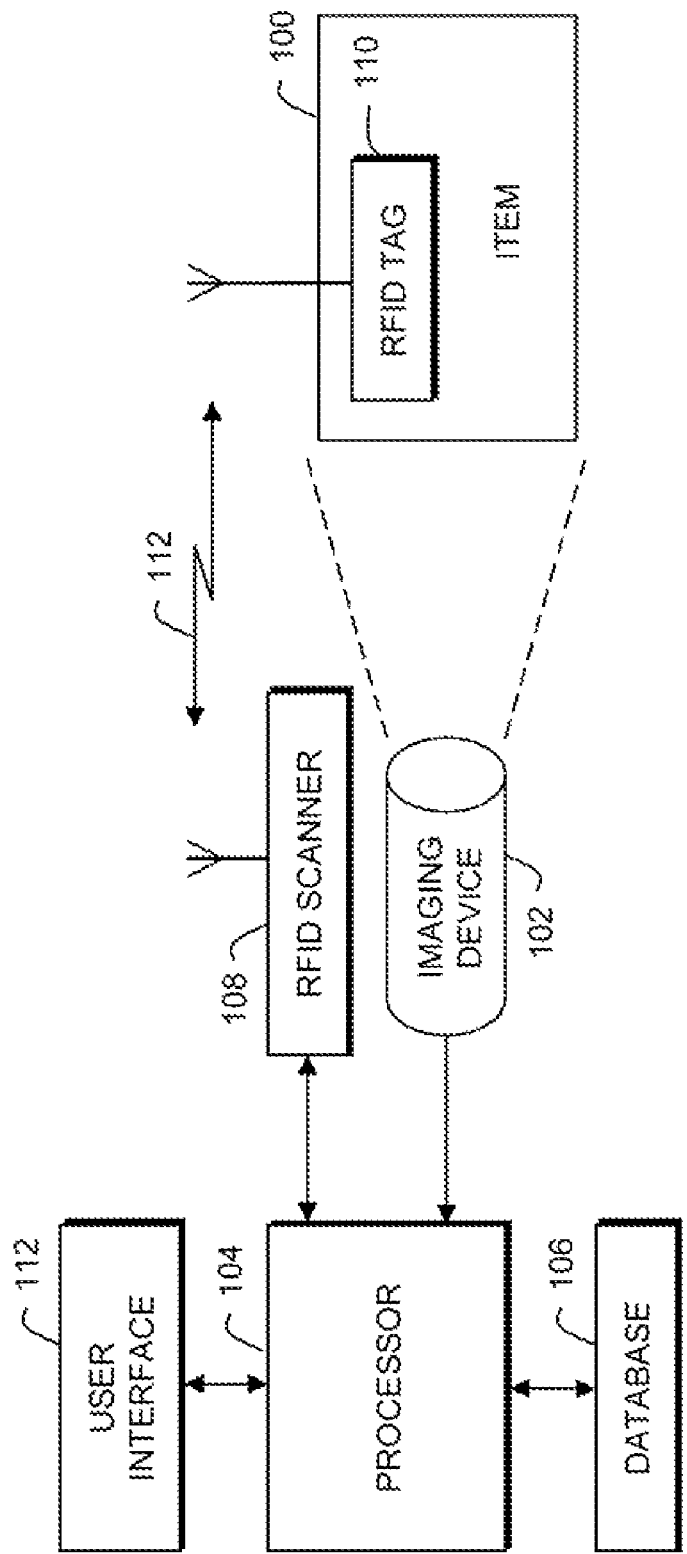
FIG. 1 is a block diagram of a system, in accordance with one embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention provides a system and method to trigger a radio frequency identification scan using image recognition, which can reduce battery drain in, and possible RF interference from, an RFID scanner. In particular, the present invention uses an imaging device to first check whether an item to be scanned is likely to have an RFID tag. If not, a scan is not performed, thereby saving battery life and eliminating an unnecessary RF signal. In operation, the present invention provides an RFID scan triggering technique that discriminates between objects that have RFID tags and those that do not. Specifically, using a camera or other imaging device, a processor is able to perform simple or advanced image analysis to distinguish between items that are likely to be tagged with RFID tags and those that are unlikely to have RFID tags. The present invention can be used for backroom RFID pick/put activity, as a personal shopping assistant, warehouse forklift pallet scans, or any other situations that might require a discriminatory RFID scan to avoid RF interference and/or battery drain.

FIG. 1 is a block diagram depiction of a wireless RFID scanning system for triggering a radio frequency identification (RFID) scan using image recognition, in accordance with the present invention. The system comprising a processor 104 coupled to a memory and/or database 106, user interface 112, RFID scanner 108 and camera or other imaging device 102. In general, components such as processors, user interfaces, RFID scanners, cameras, and memories are well-known. For example, processing units are known to comprise basic components such as, but not limited to, microprocessors, microcontrollers, memory, application-specific integrated circuits (ASICs), and/or logic circuitry. Such components are typically adapted to implement algorithms and/or protocols that have been expressed using high-level design languages or descriptions, expressed using computer instructions, or expressed using messaging logic flow diagrams.

Thus, given an algorithm, a logic flow, a messaging/signaling flow, and/or a protocol specification, those skilled in the art are aware of the many design and development techniques available to implement a processor that performs the given logic. Therefore, the elements shown each represent a known apparatus that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the elements of the present invention described above may be implemented in any one or more devices. It is within the contemplation of the invention that the operating requirements of the present invention can be implemented in software, firmware or hardware, with the function being implemented in a software processor (or a digital signal processor) being merely a preferred option.

The system described above uses a wireless RFID interface 112 for communication with electronic RFID tags 110 that may be affixed to, or embedded within, various different physical items 100, as is known in the art, and is used in the implementation of various embodiments of the present invention. RFID scanners and RFID tags are known to refer to a wide variety of business electronic platforms and can include other devices and functions, as are known in the art and therefore not shown for the sake of simplicity.

Referring back to FIG. 1, a database 106 is provided with image attributes, or preferably actual images of items. For example, in a warehouse setting, the database 106 can include photographs or image scans of all the items in the warehouse inventory. Even with thousands of different items, the database can remain a reasonable size. If database size, cost, or speed is an issue, only image attributes could be stored. In addition, a processor 104 can add the image of new inventoried items to the database 106 using an imaging device 102 such as a still or video camera under direction of a user interface 112. Images of no longer inventoried items can be removed from the database 106 by the processor 104 under direction of the user interface 112 and possibly by just scanning the item with an RFID scanner 108. The database 106 can include all inventoried items, or just those with RFID tags, depending on operational preference, memory size, costs, etc. The database 106 can also store associated information about the item, such as it's cost, number of items in stock, whether it has an RFID tag, etc.

In operation, the processor 104 controls the imaging device 102 to capture an image of an item 100 to be RFID scanned. For example, the processor 104 can direct a camera to take a still image of the item 100 when directed by the user interface (in a manual mode) or by a sensor (not shown) detecting when an item is in proximity to the scanner 108 (in an automatic mode). In this way, the RFID scanner 108 and/or imaging device 102 can be left idle when not needed. Alternatively, the camera can be left active in an automatic video mode to continuously capture images of items passing in proximity to the scanner 108.

The processor obtains these images from the imaging device 102 and compares them to the image attributes or actual images in the database 106. Image recognition algorithms are well known in the art, and need not be explained here. Commercially available image recognition software could be used in this instance. In any event, the processor determines whether an image of an item 100 matches any stored in the database 106.

Figure 2:
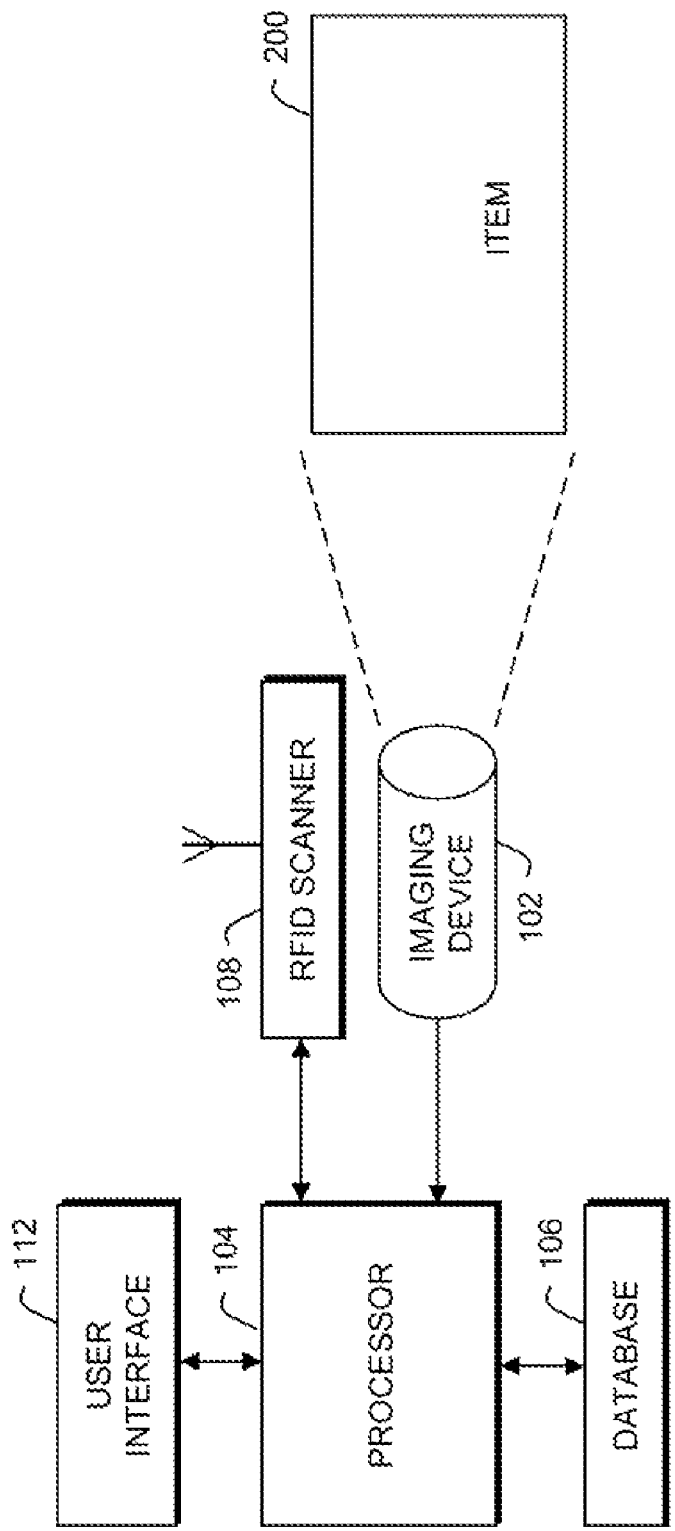
FIG. 2 is a block diagram of a system, in accordance with other embodiments of the present invention.

Referring to FIG. 2, if there is no match to any image in the database, or if there is a match in the database indicating that the item 200 is not RFID-tagged, then the processor 104 can prompt a user that this item 200 is not RFID-tagged and to ask the user to either manually enter information to register about the item 200 by means of a user interface 112 or use other data capture (e.g. bar code scanning) to enter said information, whereupon the process ends. In this way, the scanner 108 need never be activated, reducing power drain and potential interference.

However, referring back to FIG. 1, if there is a match in the database indicating that the item is RFID-tagged, the processor directs the RFID scanner to scan the item to attempt to read its RFID tag. For example, if the database only contains items that are RFID-tagged, then the image match alone will indicate that the item in the image is RFID-tagged. However, if the database contains tagged and untagged items, an image match will direct the processor to look for further information associated with the matched device in the database indicating whether the item is RFID-tagged.

The RFID scanner 108 will then relate information to the processor 104 indicating whether the attempt to read the RFID tag was successful. For example, if the attempt was successful, the scanner 108 will supply an identifier of the item 100 from the RFID tag to the processor. In this case, the processor 104 can automatically register information associated with the item 100 from the database, such as adding item identity and cost information to a billing system, decrementing the amount of stock, etc. However, if the attempt to read the RFID tag was unsuccessful, the scanner 108 will supply an unsuccessful indication to the processor 104, or the scanner will send no response wherein the processor 104 will recognize that no response from the scanner 108 acts as an unsuccessful indication of an unsuccessful read. In this case (as for FIG. 2), the processor 104 can prompt a user that this item 200 is not RFID-tagged and to ask the user to manually enter information to register about the item 200 by means of a user interface 112 or use other data capture (e.g. bar code scanning) to enter said information, whereupon the process ends.

There is the possibility of false-positive or true-negative results for the image match and the attempted RFID tag read, which the present invention also addresses. In a first example, if the processor incorrectly matches the captured image to an RFID-tagged item in the database, whereas the imaged item is actually not RFID-tagged, then the attempt to read the RFID tag will fail, which will correctly prompting user intervention. In a second example, if the processor incorrectly matches the captured image to an RFID-tagged item in the database, whereas the imaged item is actually a different RFID-tagged item, then the attempt to read the RFID tag will still properly identify the correct item. In a third example, if the processor incorrectly matches the captured image to an RFID-tagged item in the database, whereas the imaged item is actually a different RFID-tagged item, and the attempt to read the RFID tag fails, this will waste a small amount of time but will correctly prompt user intervention. In a fourth example, if the processor correctly matches the captured image to an RFID-tagged item in the database, and the attempted reading of the RFID tag fails, this will waste a small amount of time but will correctly prompt user intervention.

Figure 3:
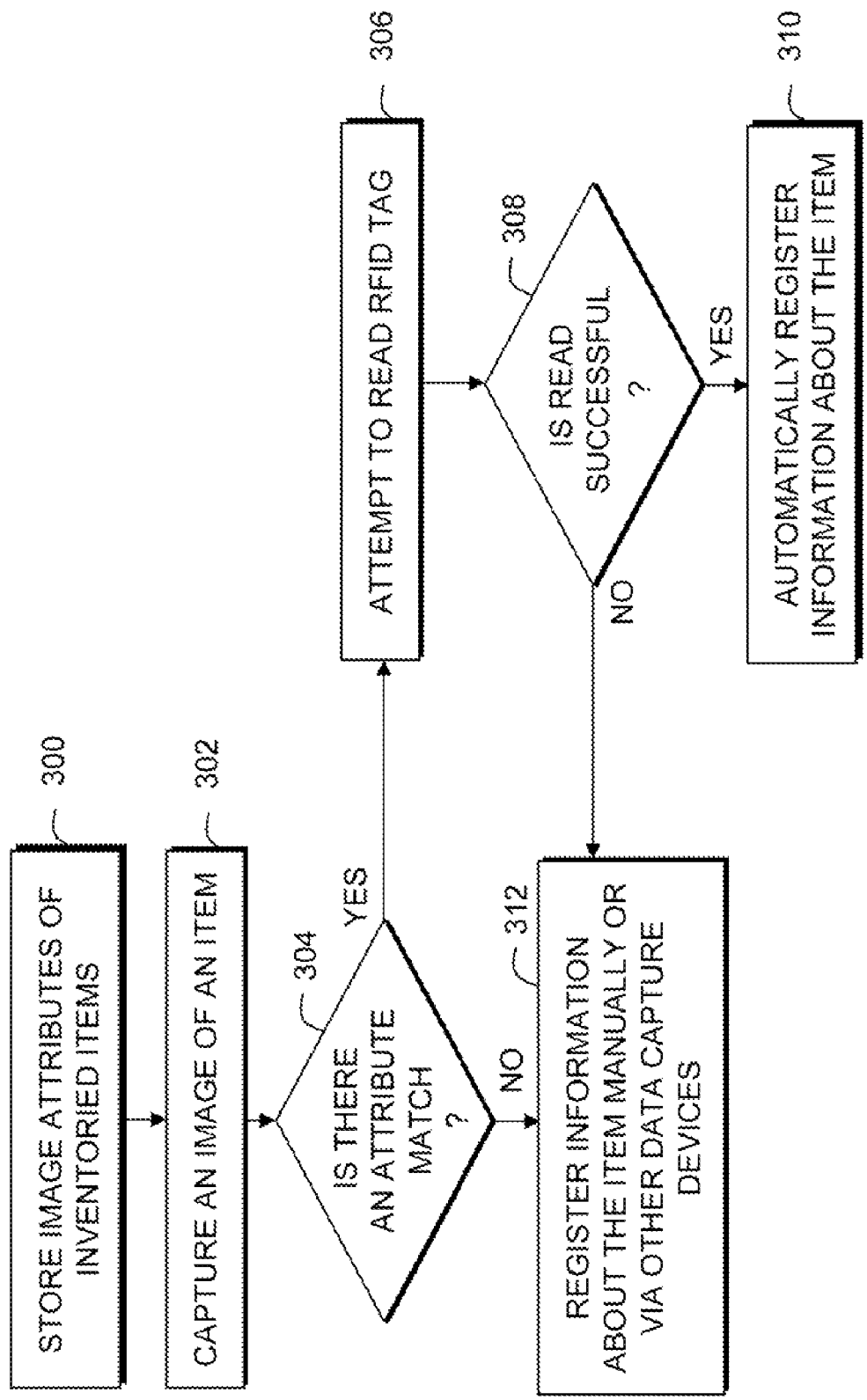
FIG. 3 is a flowchart of a method, in accordance with the present invention.

FIG. 3 illustrates a flowchart of a method for triggering a radio frequency identification scan (RFID) using image recognition, in accordance with the present invention.

The method starts by storing 300 image attributes, or preferably actual images of items in a database. The database includes at least those inventoried items that have RFID tags, but can include all inventoried items including those without RFID tags. Preferably, the database can also store associated information about the item, such as it's cost, number of items in stock, whether it has an RFID tag, etc.

The method includes capturing 302 an image of an item from an imaging device, such as a still or video camera.

The method includes determining 304 if there is a match between attributes of the captured image, or the actual image itself, compared with the stored image attributes and/or images in the database indicating that the item is RFID-tagged.

If there is no match to any image in the database, or if there is a match in the database indicating that the item is not RFID-tagged, then a user is asked to manually enter information to register about the item 312, whereupon the process ends. In this way, the RFID scanner need never be activated, thereby reducing power drain and potential interference.

However, if there is a match in the database indicating that the item is RFID-tagged, the RFID scanner then attempts to read 306 the item's RFID tag.

If the attempt to read the RFID tag 308 was successful, information associated with the item from the database can be automatically registered 310, such as adding the item identity and cost information to a billing system, decrementing the amount of stock, etc. However, if the attempt to read the RFID tag 308 was unsuccessful, the user can be asked 312 to enter information to register about the item manually or use other data capture (e.g. bar code scanning) to enter said information, whereupon the process ends.

Advantageously, the present invention reduces the chance for electromagnetic interference caused by unnecessary RFID reads, thereby freeing up RF spectrum and reducing the number of battery-draining RFID reads. The present invention can also automatically trigger scans rather than requiring user intervention, and can identify whether a presented body is likely to actually have a tag on it.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system for triggering a radio frequency identification (RFID) scan using image recognition, the system comprising: a database operable to store image attributes of inventoried RFID-tagged items along with information associated with the RFID-tagged items; an imaging device operable to capture an image of an item before attempting an RFID scan of that item; a processor coupled to the imaging device, the processor operable to determine if there is a match between attributes of the captured image compared with the stored image attributes in the database indicating that the item is RFID-tagged; and a RFID scanner coupled to the processor, wherein upon a match determination by the processor, the processor automatically triggers the RFID scanner to attempt to scan an RFID tag of the item, wherein if the attempt to scan the RFID tag of the item is successful, the RFID scanner supplies an identifier of the item from the RFID tag to the processor, which then automatically registers the information associated with the item from the database, and wherein if there is no match determination by the processor, no attempt is made to scan an RFID tag of the item, and a user is prompted for manually registering information about the item on a user interface.

2. The system of claim 1, wherein upon a match determination by the processor, and wherein if the attempt to scan the RFID tag of the item is unsuccessful, the RFID scanner supplies an unsuccessful indication to the processor, which can prompt a user to enter information about the item on the user interface.

3. The system of claim 1, wherein the processor is operable to add and remove items and their attributes from the database by using the imaging device under direction of the user interface.

4. The system of claim 1, wherein the registered information is adding item identity and cost information to a billing system.

5. The system of claim 1, wherein the registered information is decrementing the amount of stock of that identified item from inventory.

6. The system of claim 1, wherein if the processor incorrectly matches the captured image to an RFID-tagged item in the database, wherein the imaged item is actually not RFID-tagged, then the attempt to scan the RFID tag fails, whereupon the processor prompts a user to enter an updated image of the item in the database.

7. The system of claim 1, wherein if the processor incorrectly matches the captured image to an RFID-tagged item in the database, wherein the imaged item is actually a different RFID-tagged item, then the attempt to scan the RFID tag still properly identifies the correct item.

8. The system of claim 1, wherein if the processor incorrectly matches the captured image to an RFID-tagged item in the database, wherein the imaged item is actually a different RFID-tagged item, then the attempt to scan the RFID tag fails, whereupon the processor prompts a user to enter an updated image of the item in the database.

9. The system of claim 1, wherein if the database also contains items that are not RFID-tagged, then the database contains further attributes indicating which items contain an RFID tag, then upon an image match the processor retrieves these further attributes from the database indicating whether the matched item contains an RFID-tag before attempting an RFID scan of the item.

10. A method for triggering a radio frequency identification (RFID) scan using image recognition, the method comprising: storing image attributes of inventoried RFID-tagged items in a database along with information associated with the RFID-tagged items; capturing an image of an item from an imaging device before attempting an RFID scan of that item; determining if there is a match between attributes of the captured image compared with the stored image attributes in the database indicating that the item is RFID-tagged; and if there is a match determination, automatically triggering an RFID scanner to attempt to scan an RFID tag of the item, wherein if the attempt to scan is successful, automatically registering the information associated with the item from the database, and if there is no match determination, no attempt is made to scan an RFID tag of the item, and a user is prompted for manually registering information about the item.

* * * * *